United States Patent [19]

Waldman

[11] 4,243,844

[45] Jan. 6, 1981

[54] HOLD CIRCUIT FOR TELEPHONE SYSTEM

[76] Inventor: Herbert H. Waldman, 1739 52nd St., Brooklyn, N.Y. 11204

[21] Appl. No.: 943,679

[22] Filed: Sep. 19, 1978

[51] Int. Cl.³ .............................................. H04M 1/00
[52] U.S. Cl. ................................ 179/81 R; 179/99 H
[58] Field of Search ................................ 179/81 R, 99

[56] References Cited

U.S. PATENT DOCUMENTS

| | | | |
|---|---|---|---|
| 3,629,514 | 12/1971 | Flamini | 179/81 R |
| 4,001,520 | 1/1977 | Waldman et al. | 179/99 |
| 4,011,413 | 3/1977 | Phillips | 179/99 |

*Primary Examiner*—Bernard Konick
*Assistant Examiner*—Joseph A. Popek
*Attorney, Agent, or Firm*—Friedman, Goodman & Teitelbaum

[57] ABSTRACT

A single master unit hold circuit which can be utilized for a single or a group of telephone instruments connected to a common telephone line. A single latching circuit is coupled to the telephone line. The establishment of the hold condition may be affected in the off-hook state of the telephone instrument. Each of the telephones of the group has associated signaling capability. Each telephone can generate an actuating signal directly onto the telephone line, which is then detected by the latching circuit, and in response thereto a hold condition is placed on the telephone line. The hold condition is affected via the telephone line, by a momentary actuation of a control circuit common to the hold circuit and the control circuit; the control circuit being a part of the telephone instrument call-out circuit network. The signaling can be accomplished by the rotary dial on a dial phone instrument or by the push button pad on an instrument sold under the trademark Touch-Tone, or by means of other types of frequency generating devices. The hold condition is initiated and established while the phone instrument is in its off-hook state. Moreover, the active telephone instrument continues to remain in its voice communication state, the hold condition having been established, not withstanding, as long as the telephone receiver is not placed on-hook. A key feature of the invention is that the off-hook state and/or voice transmission state of the telephone instrument constitutes the decisive conduit or channel by which the control circuit can activate the hold circuit. The hold circuit cannot readily become activated when the telephone receiver (handset) is in the on-hook state.

51 Claims, 17 Drawing Figures

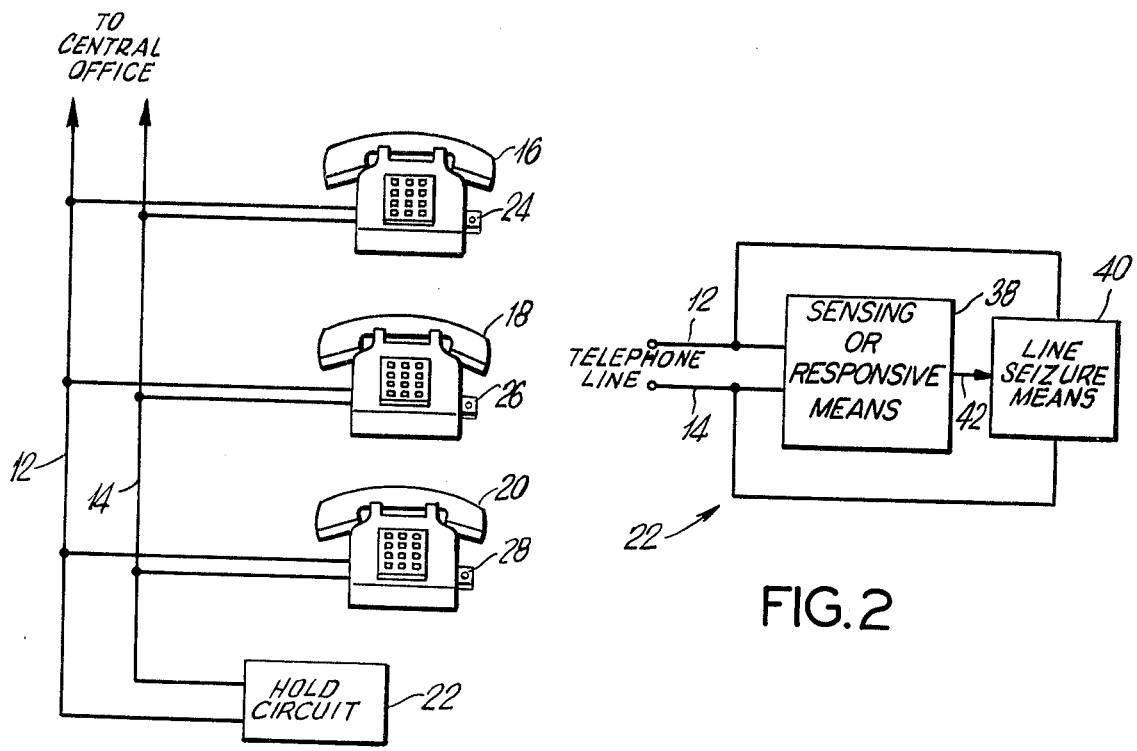
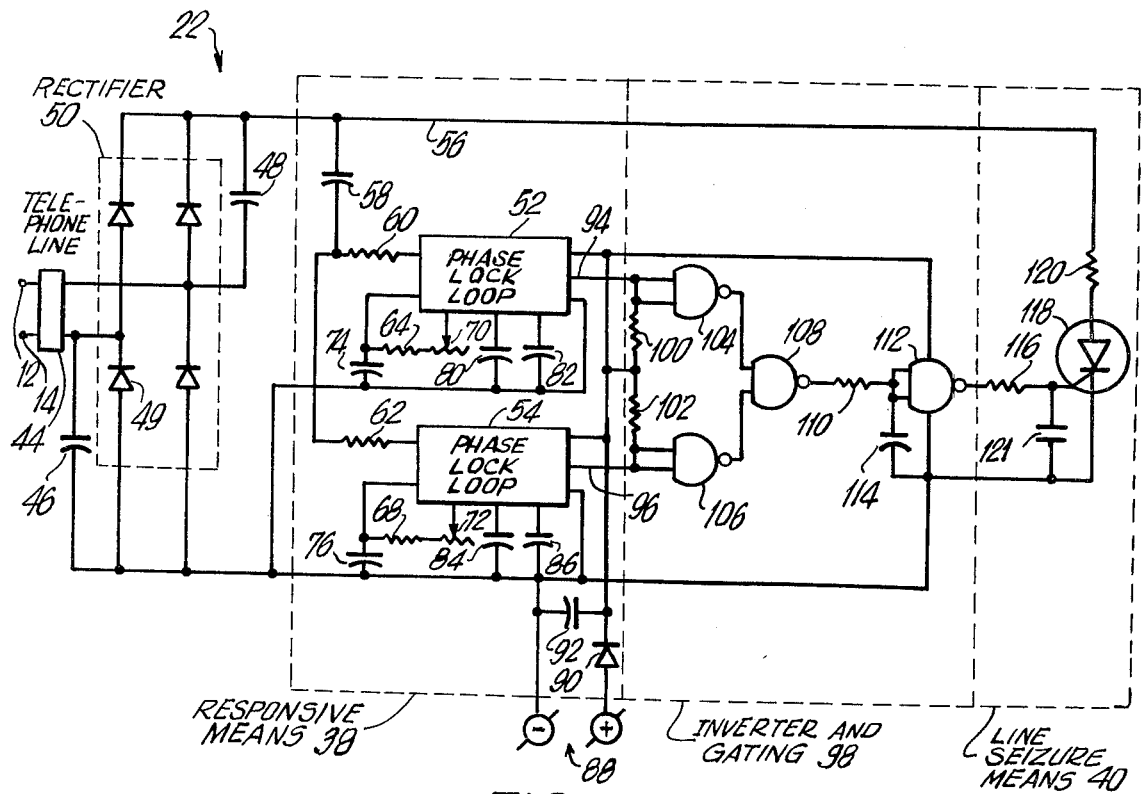

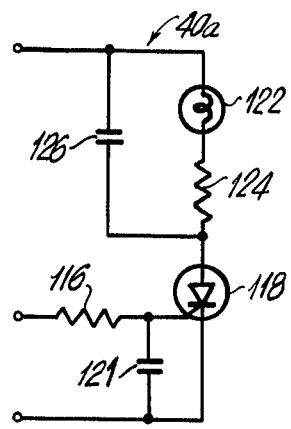
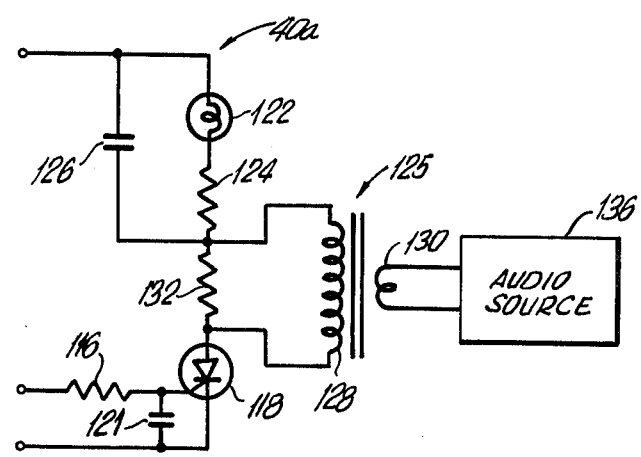
FIG.4  FIG.5
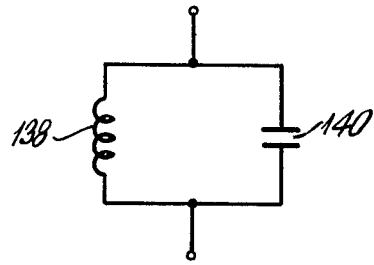
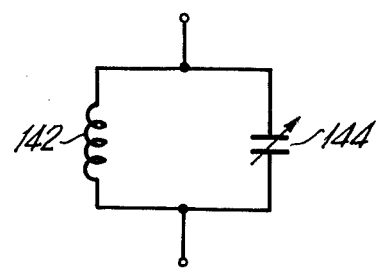
FIG.6  FIG.7
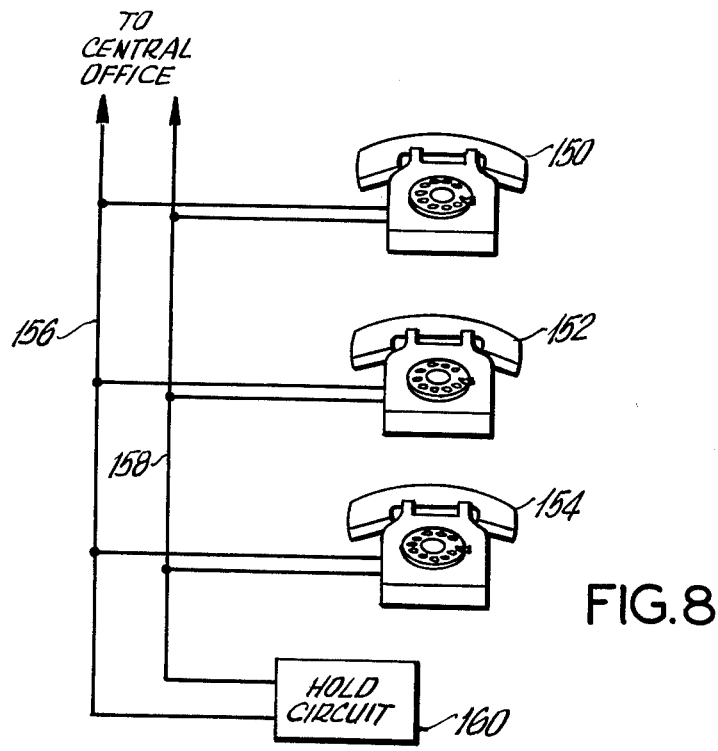
FIG.8

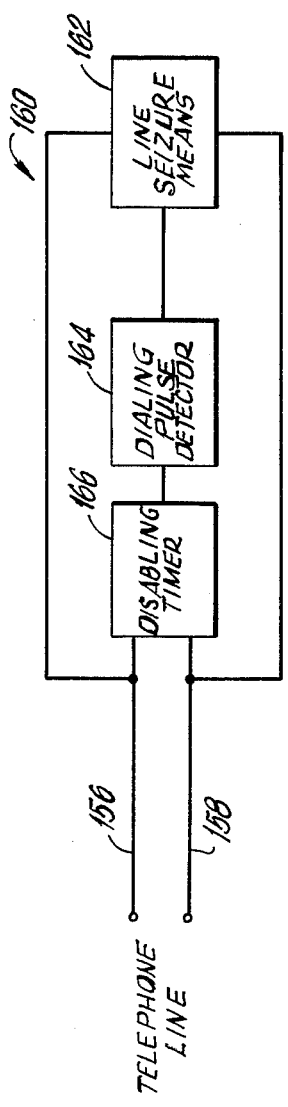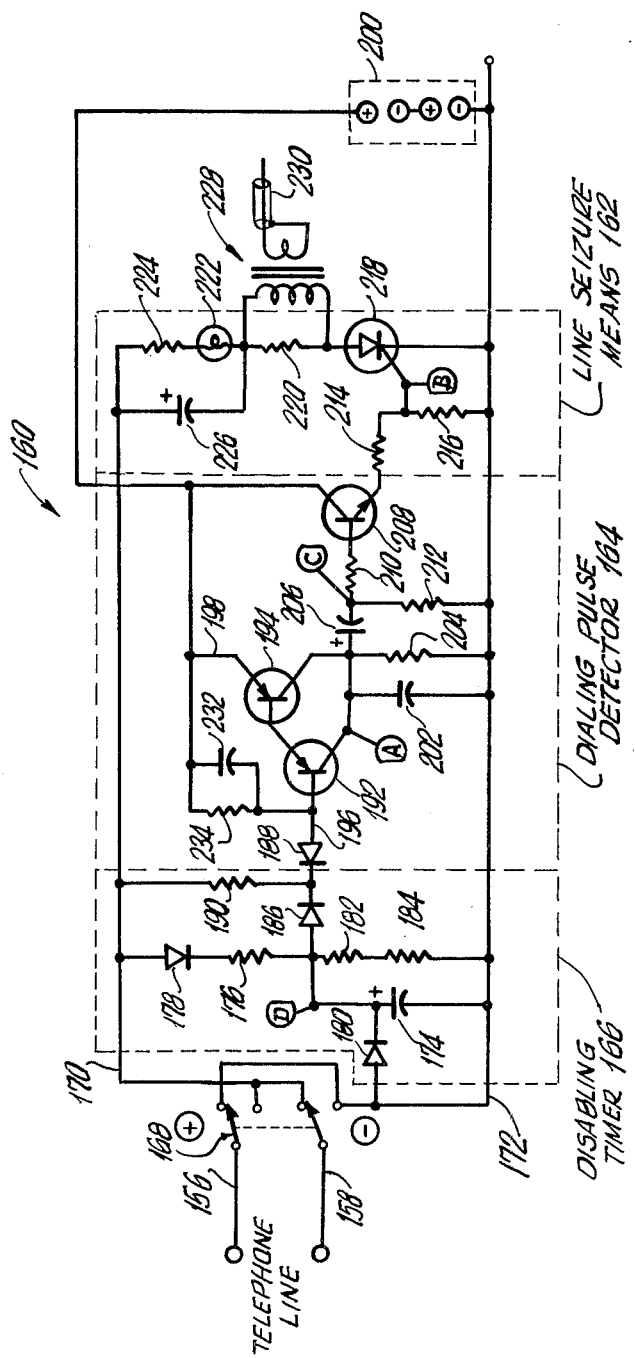

HOLD CIRCUIT FOR TELEPHONE SYSTEM

BACKGROUND OF THE INVENTION

This invention relates to telephone holding circuits, and more particularly to an automatic release telephone hold circuit for a series of telephones connected to a telephone line.

Telephones with hold features are well known. Generally, these devices are provided by the telephone company for use on multiline telephones having a plurality of push buttons on the phone. The hold circuitry involved in such devices is generally complex in construction and requires special costly installation. The telephone company charges an initial installation fee for providing the hold equipment and also charges a monthly fee for such service. The known types of hold devices are of the mechanical push button type used for both applying the hold condition and for releasing the hold condition. Specifically, to establish a hold condition, the hold button is pressed down and immediately the telephone is put on hold while making the telephone handset inoperative for voice communication. To release the hold condition and restore the voice communication, a second mechanical button must be depressed.

Because of this excessive cost involved in providing a telephone with a hold feature and because of the complexity of the standard telephone hold equipment, numerous other types of hold circuits have been provided and are readily available. The other types of hold circuits respond to changes in voltage level on the telephone line to thereby detect an on-hook and off-hook condition of an associated telephone instrument. The hold circuit, upon actuation, will either maintain or release its hold mode in response to its detection of such telephone line voltage level changes. However, this detection capability differentiating between on-hook and off-hook voltage levels by prior art hold circuits, requires that the phone instrument be on-hook in order that the hold circuit maintain its hold mode subsequent to its actuation. More specifically, to activate the hold circuit an actuating control switch after being initially depressed, must be continuously retained in its depressed condition until after the telephone handset is replaced on-hook. And, only after that time, will the higher on-hook voltage cause a latching circuit to maintain the hold mode on the phone line and only then may the control switch be released. These types of prior art hold circuits therefore, in addition to presenting an inconvenience because of the aforementioned requirement to maintain the hold button depress D, are also prone to inadvertent disconnection of the far-end party if the hold button be released prematurely.

Another difficulty with many prior art hold circuits is that they are not automatically released when a telephone is picked up. With many such hold circuits, it is necessary to go back to the same telephone on which the hold was set in order to release the hold condition. Therefore, in a situation were a user wants to place a telephone on hold so that he can go to another location and pick up an extension, after completing the telephone call he must return back to the original telephone in order to release the hold condition. This inconvenience has also prevented widespread acceptance of these thpes of hold circuits.

Yet another type of available hold circuit responds to the changes in voltage levels and also provides an intermediate voltage level in between the on-hook and off-hook voltages, in order to latch the hold condition. This type of circuit in addition to requiring that the actuation control switch be maintained depressed as above mentioned, has extremely limited use because the actual voltages on a telephone line will fluctuate over a wide range. The typical $-50$ volts applied at a central office can vary to as low as $-25$ volts, or even less, when the telephone is located at a substantial distance from the central office. At the same time, the off-hook voltage can vary from as little as $-3$ volts to as much as $-10$ volts, and in some cases $-15$ volts. Accordingly, the ranges tend to approach each other providing little intermediate values. As a result, circuits responsive to an intermediate voltage level can produce erroneous results because of the variations and fluctuations of the telephone line voltages existing throughout various locations.

A further disadvantage of the above mentioned hold circuit is its requirement for continuous line current drain in its standby mode.

An improved hold circuit which avoids most of the aforementioned problems is described in my U.S. Pat. No. 4,001,520, issued Jan. 4, 1977. In that patent there is described an improved hold circuit which includes a relay having a coil and normally open contacts. A normally opened momentary contact switch is connected in series with the relay coil, and the series combination is connected across the telephone lines. The contact switch is connected in parallel to the normally opened contacts of the relay. The hold circuit captures or seizes the telephone lines when the contact switch is closed, and permits the telephone lines to be released upon removing the telephone handset offhook. A parallel combination of a lamp and a capacitor is connected in series between the relay contacts and the relay coil to ensure automatic release of the telephone line when any of the telephones connected to the lines are placed off-hook. An alternate circuit which substitutes a semiconductor element for the relay is also shown in my above mentioned patent.

The hold circuit described in my aforementioned patent provides unique benefits not achieved by any of the prior hold circuits. For example, in my described improved hold circuit it is not necessary to maintain the button while the telephone is replaced on-hook. On the contrary, momentary depression of the hold button immediately establishes a hold condition even if the telephone is retained off-hook. Furthermore, even though the hold condition has been established, the telephone handset still remains active and is still in voice communication with the telephone line until it is actually placed back on-hook. However, the hold circuit retains the line seized.

Additional benefits of the aforementioned hold circuit include the automatic release of the hold condition upon pick-up of any of the extension phones from its respective hook. Also, when the far-end party to the conversation disconnects the telephone line, the disconnect pulse removes the hold condition. Furthermore, because of the use of the lamp in the load circuit, there is provided a visual indication of the operational status of the hold circuit prior to replacing the telephone on-hook. The lamp can also provide a visual indication when the circuit releases the hold condition, and can also provide an indication of eavesdropping on the line, thereby ensuring the privacy of the conversation.

Further benefits are provided by utilizing the aforementioned hold circuit, in that in standby, its line current drain is zero. Also, a great range of voltage fluctuations can be accommodated by the circuit, and it still operates effectively. All of the aforementioned prior art systems require that each telephone instrument have some form of actuating control switch as an add-on component to the phone instrument in order that same be conveniently accessible to the user. Moreover, in all of the aforementioned prior art systems, multiple telephone instruments, although connected to a common phone line would necessitate providing a separate and complete hold device for each individual instrument of the multiple telephone group. The above constitutes two distinct shortcomings and major disadvantages of the prior art systems.

The subject invention overcomes both of the above disadvantages. In the instant invention, the telephone instrument call-out means, i.e., the rotary dial or push button pad, is employed as the actuating means to activate the hold circuitry.

Although my aforementioned hold circuit provides unique and improved benefits over prior art systems, as described in the aforementioned patent, nevertheless, it is necessary to have a separate hold circuit for each telephone extension connected on a particular telephone line. Thus, in a typical system having a single telephone line with multiple telephone units connected to that line, each of the telephone units would require its own hold circuit of the type described. It would therefore be beneficial to avoid the necessity of multiple holding circuits when a large number of telephones are connected to the same telephone line.

U.S. Pat. No. 4,011,413 issued Mar. 8, 1977, attempts to solve this problem by providing a single sensing and latching circuit connected across the telephone line with a separate actuating control switch connected to each telephone unit within the system. The single sensing and latching unit senses the on-hook and off-hook voltage levels, and also responds to an intermediate voltage level between the high on-hook voltage and the low off-hook voltage. Each of the individual control switches affects the intermediate voltage level for detection by the single sensing and latching unit. However, in order to achieve the intermediate voltage level, it is necessary to depress the control switch and maintain it in a depressed condition while the telephone handset is replaced into its on-hook condition. It is impossible to only momentarily actuate the control switch in order to establish the hold condition. The depressed control button must be so maintained until the receiver is back on-hook before the intermediate voltage level is generated to cause the latching unit to seize the line into a hold condition. Moreover, each extension station must have its own individual add-on custom design control switch associated with it in order to be able to activate the hold circuit. Furthermore, the intermediate voltage level is only applicable for limited telephone systems where the intermediate range between the on-hook voltage and the off-hook voltage is sufficiently wide. However, because of the wide fluctuations of telephone voltages, in most practical situations it will be extremely difficult to accurately sense the intermediate voltage level making it extremely difficult to achieve universal accurate and consistently reproducible hold conditions.

SUMMARY OF THE INVENTION

It is accordingly an object of the present invention to provide an improved hold circuit for a telephone system which avoids the aforementioned problems of prior art devices.

A further object of the present invention is to provide a hold circuit which requires only a single hold unit for a telephone line regardless of the number of telephones associated with that line and utilizes the rotary dial or push button pad associated with each phone instrument as the actuating signaling means to activate the hold circuit.

A further salient object of the instant invention is to provide a hold circuit which can be activated from any of a plurality of telephone instruments associated with the hold circuit without requiring any add-on controls at each instrument or any alterations or modifications of the instruments.

Another object of the present invention is to provide a hold circuit which provides automatic audio, such as music, on-hold and automatic audio shut-off on release of the hold circuitry, where one single audio source is sufficient for a multiple telephone instrument system having a plurality of telephone instruments connected to a common telephone line.

Yet another object of the present invention is to provide a hold circuit for a telephone system having a number of telephones connected to a telephone line, wherein the hold condition is established by momentarily providing an actuating hold signal when the telephone is in an off-hook condition.

A further object of the present invention is to provide a hold circuit for a telephone system having a number of telephones connected to a telephone line, wherein the existing call-out portion of the telephone is utilized to generate the actuating hold signal or pulse, thereby, obviating the need for add-on individual control switches at every associated extension station.

Another object of the present invention is to provide a hold circuit for a telephone system which is automatically released upon pick-up of any extension, or by means of a disconnect pulse provided on the telephone line.

Still another object of the present invention is to provide a hold circuit for a telephone system which can be utilized with a wide range of fluctuating voltages for on-hook and off-hook conditions.

Yet another object of the present invention is to provide a hold circuit for a multiple telephone system providing a visual indication of the operation and release of the hold condition.

A further object of the present invention is to provide a hold circuit for a multiple telephone system which includes a visual indicator which can be used to detect eavesdropping by an unauthorized listener or an extension phone connected to the same telephone line.

Still another object of the present invention is to provide a hold circuit for a telephone system which has a number of telephones connected to a single telephone line, and includes a hold circuit on the telephone line which contains an audio frequency detector, and wherein individual audio frequency means are associated with each of the individual telephone units for placing an audio signal on the line implementing a hold condition.

Yet another object of the present invention is to provide a hold circuit for a telephone system utilizing a single push button pad key as the actuating switch for initiating a hold condition.

Still another object of the present invention is to provide a hold circuit for a telephone system which has a number of telephones connected to a single telephone line, and includes a hold circuit on the telephone line which contains a dial pulse detector, and wherein individual audio frequency dialing means are associated with each of the individual telephone units for placing a dial pulse on the line implementing a hold condition.

Yet another object of the present invention is to provide a hold circuit for a telephone system utilizing a digit on the telephone dial as the actuating switch for initiating a hold condition.

Another object of the present invention is to provide a hold circuit for a telephone system which can be activated in a hold mode by a hand-held tone generator acoustically coupled to the telephone line.

An additional object of the present invention is to provide a hold circuit for a telephone system which will permit a telephone subscriber to "busy out" his telephone line enabling him to insulate himself from annoying intrusion of telephone calls without having to remove the telephone handset from its cradle.

According to a broader feature of the invention, there is provided a hold circuit for a telephone line which includes a plurality of telephones connected to the telephone line. The hold circuit comprises responsive means and line seizure means coupled to the telephone line for establishing a hold condition onto the telephone line. Each of the telephones has an actuating signaling means associated with it, which can activate the hold circuit, thereby establishing the hold condition. The signaling means are operative when the associated telephone is in an off-hook condition.

In an embodiment of the invention, the signaling means generates an audio signal onto the voice path of the telephone to activate the hold circuit. The hold circuit includes a frequency detector which detects a particular audio frequency and in response thereto activates a latching device which places the hold condition onto the telephone line. When a a telephone sold under the trademark Touch-Tone is being utilized, one of the used keys of the push button system can be utilized as the hold button to provide the frequency signal onto the telephone line.

In an embodiment of the invention, the line seizure means includes a semiconductor latching element with its main current carrying electrodes coupled to the telephone lines. A load is connected in series between the latching electrodes and the telephone line. The load consists of a resistive element such as a resistor and/or visual indicator. A capacitor is connected in parallel with the load. The capacitor is effective to ensure that the voltage developed across the capacitor causes the semiconductor latching element to become de-energized and the resultant release of the telephone line by the latching element upon the rendering of a telephone in an off-hook condition subsequent to an on-hook hold mode condition of the telephone.

BRIEF DESCRIPTION OF THE DRAWINGs

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a schematic drawing showing a push button type telephone system which utilizes the hold circuit of the present invention.

FIG. 2 is a block diagram of the hold circuit in accordance with the present invention.

FIG. 3 is a schematic drawing of an electrical circuit showing one embodiment of the hold circuit of the present invention.

FIG. 4 is a schematic drawing of another embodiment of the hold circuit utilized as part of the line seizure circuit means of the present invention.

FIG. 5 is a schematic drawing of a further embodiment of the hold circuit for use as part of the line seizure circuit means of the present invention, and including an external audio source feature.

FIGS. 6 and 7 show alternate embodiments of frequency detection circuits for use in the responsive circuit means of the present invention.

FIG. 8 is a schematic drawing showing a rotary dial type telephone system which utilizes the hold circuit of the present invention.

FIG. 9 is a block diagram of the hold circuit for use in the system shown in FIG. 8.

FIG. 10 is a schematic drawing of an electrical circuit showing an embodiment of the hold circuit of the present invention useful for a rotary dial system, and FIGS. 11–13B show graphic representations useful in explaining the operation of the circuit shown in FIG. 10.

In the various figures of the drawing, like reference characters designate like parts.

DETAILED DESCRIPTION OF THE PREFERRED EMBODIMENT

Figure 11A:
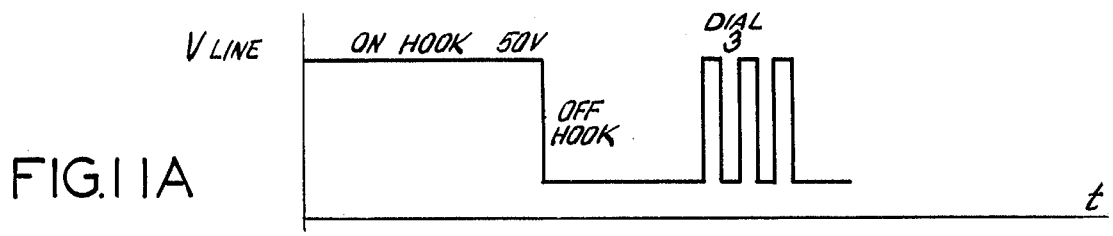
FIG. 11A showing the line voltage and FIG. 11B showing the voltage at point D along a time axis as a function of the disposition of the telephone handset.

Referring now to FIG. 1 there is shown a general telephone system to which the present invention finds use. The system includes a pair of telephone lines 12, 14 to which are connected a number of individual telephone sets 16, 18, 20. The telephone lines interconnect to a central office through which calls can be made and received by means of the telephone lines. Telephones sold under the trademark Touch-Tone are shown in this embodiment, and in a subsequent embodiment, the invention will be described in connection with rotary dial phones. However, the invention is also applicable to repetitory dialers, etc.

Although there are shown a number of individual telephones, a single hold circuit 22 is utilized and is connected directly across the telephone lines 12, 14. Additionally, each of the telephones has its own signaling circuit 24, 26, 28 through which a hold signal can be applied and sent directly onto the telephone lines 12, 14 to be detected by the hold circuit 22, to thereby establish a hold condition on the lines 12, 14. Although separate signaling circuits 24, 26 and 28 are shown each with its own hold button, as will be appreciated hereinafter, these signaling circuits can be eliminated and one of the Touch-tone dial keys on the Touch-tone dialer can be utilized to apply the hold signal. For example, the "star"

key which is provided on the Touch-tone system and is generally not used for conventional dialing can be utilized as the actuating switch to apply its single onto the telephone line to be detected by the hold circuit thereby establishing the hold condition. It should also be appreciated that the signaling circuit need not be connected to the individual telephone units. Because the audio channel of the telephone lines are utilized for sending the signal to the hold circuit, a hand held frequency generator can be brought close to the telephone receiver and a given audio frequency signal transmitted through the receiver onto the telephone line will also serve the purpose of providing an activating signal for establishing the hold condition.

As is evident from FIG. 1, although a number of individual telephones are contained within the telephone system and connected to the same telephone lines, only a single hold circuit is needed for the entire system. Thus, only one hold circuit is needed for each telephone line regardless of the number of telephone extensions connected to that telephone line. All that is necessary is that each of the individual telephones connected to that line have a signaling means to send a particular audio frequency signal onto the telephone line which can then be detected by the hold circuit. Such signaling means can either be by a separate button, as shown, or by a Touch-tone key as described, or by a hand held frequency generator as heretofore mentioned.

It should also be appreciated that since a signal is sent onto the telephone lines itself, that such signal can be sent only while the individual telephone is in an off-hook condition and is activated to be in voice communication with the telephone line. Thus, whether it be the Touch-tone key or a separate hold button, the button need only be depressed momentarily in order to generate the audio frequency. Such button is depressed while the telephone receiver is maintained in its off-hook condition. The button does not have to be continuously depressed until the telephone is returned to its on-hook condition.

Referring now to FIG. 2, there is shown a block diagram of the hold circuit 22 wherein it is noted that the hold circuit includes two basic sections, namely responsive means 38 and line seizure means 40. The responsive means 38 is connected to the telephone lines 12, 14 and includes a frequency detector whereby it can detect various audio frequencies placed on the line, so that the responsive means 38 is also considered to function as sensing means. The frequency detector is preset to detect a single one or a multiple of frequencies and produces an output voltage on line 42 in response to such detection. By way of example, if a Touch-tone telephone is utilized and one of the keys is assigned for use as the hold button, the responsive means will comprise frequency detection means for detecting two frequencies. As is well known, a Touch-tone signal is a multifrequency tone having two separate audio frequencies. Each of the two frequencies of each Touch-tone key are unique. Therefore, the unique two frequencies making up the predetermined Touch-tone key serving as the actuating button will be detected by the responsive means 38 and the output voltage is impressed onto line 42. Additionally, any other type of audio frequency generator can be utilized to provide a predetermined signal at an individual telephone. If, for example, a hand held signal generator is utilized, a single frequency will be sent onto the telephone line and will be detected by the frequency detectors. It is noticed, however, that rather than detecting voltages on the telephone line, specific frequencies are detected on the line for actuating the hold circuit. It is therefore evident that the voice channel of the telephone line is being utilized rather than its voltage characteristics.

The voltage on line 42 is applied to the line seizure means 40 to actuate it whereby a predetermined resistance is placed across the telephone lines to simulate the resistance of an on-hook telephone. Thus, although the telephone can be returned to its on-hook condition, the effective resistance placed by the hold circuit on the telephone lines will be sufficient to hold and seize the telephone lines so that the telephone conversation will remain on the telephone line without being disconnected.

The hold circuit will keep the line seized under a hold condition until one of the telephones in the system are taken off-hook, whereby automatic release of the hold condition will be effected. Additionally, if the far-end party at the other end of the telephone line should hang up his phone, a disconnect pulse would be applied to the telephone line which would also automatically release the hold condition.

Although numerous types of frequency detectors and hold circuits could be utilized to carry out the aforedescribed invention, as well as numerous types of signaling circuits to impose the audio signal on the line, FIG. 3 represents one embodiment which has been tested and found effective in carrying out the aforementioned features of the present invention. Referring now to FIG. 3, the ring and tip pair of the telephone lines 12, 14 are connected by means of a telephone phone jack 44 to the hold circuit 22. Capacitors 46 and 48 respectively serve as the audio path in order to pass the audio frequency signal voltage. A rectifier 50 formed of four diodes 49 is connected in a bridge arrangement. This affords the advantage that the hold circuit 22 may be connected to the telephone lines 12, 14 without regard to polarity.

The signal from the telephone line passes from the upper line 56 which extends from the telephone line 12, to the responsive means 38 which comprises two phase lock loops 52, 54 formed of integrated circuit chips. The phase lock loops are coupled to the upper line 56 which extends from telephone line 12, through the capacitor 58 which provides a suitable frequency path for maximum efficiency. Resistors 60, 62 feed the signals to each of the phase lock loops 52, 54. The fixed resistors 64, 68 are each provided with a potentiometer 70, 72 extending therefrom to permit tuning and adjusting of the phase lock loops 52, 54 to respond to specific frequencies to be detected. Capacitors 74, 76 respectively couple each phase lock loop to the bottom line 78 which extends from telephone line 14. Capacitors 80 and 82 associated with phase lock loop 52, and 84 and 86 associated with phase lock loop 54 provide appropriate delays and frequency discrimination to avoid detection of speech signals. The phase lock loops are energized by means of a DC supply applied at 88 sent through a circuit protection diode 90 and a filtering capacitor 92.

The output from the phase lock loops on lines 94, 96 are sent to a combined inverter and gating circuit 98. The inverter and gating circuit 98 includes inverters 104 and 106 which receive the signals from the phase lock loops and provide both signal outputs to NAND gate 108. The output from the NAND gate is sent across resistor 110 to the inverter 112. The combination of capacitor 114 and resistor 110 acts as a time delay to assure the validity of the desired frequency.

The output from the inverter and gating circuit 98 is fed to the line seizer circuit 40. The output from invert 112 passes through the resistor 116 to the control electrode of an SCR 118 whose current carrying electrodes are respectively placed in series with a load resistor 120 and interconnected across the telephone line extensions 56, 78. Capacitor 121 connected across the control electrode is an RF by-pass to eliminate RF fluctuations and interference or noise transients which may be generated in the circuit. Resistor 116 serves as a current limiting resistor and provides a return path for the control electrode current.

The operation of the circuit shown in FIG. 3 is as follows. When a preselected audio frequency pair serving as the hold signal is placed on the telephone line, the frequency detector having its phase lock loop tuned to these frequencies will detect the presence of these frequencies on the telephone line. The signal will be sent through the inverter and gating circuit 98 to send a pulse to the SCR 118 to turn it on. The SCR will immediately conduct causing current to pass through the resistive load 120 and place the load across the telephone lines. The load is set to effect a duplication of the off-hook resistance of a telephone. It should be noted, that although the hold condition is affected as soon as current passes through the SCR, the individual telephone units remain active and continue in voice communication with the telephone line until the telephone set is placed on its on-hook condition. The line nevertheless will remain held by the hold circuit 22. Subsequently, a disconnect pulse on the line caused by the other party to the conversation hanging up, will cause an interruption of the current flow in the telephone line upon hang-up or shortly therefter. This will immediately reduce the current through the SCR below its holding value and will turn off the SCR so that the holding condition is removed from the circuit. In order to remove the holding circuit without a disconnect pulse, a manual switch could be included to turn off the SCR. Such manual switch could be placed in series with the SCR. Alternatively, a Zener diode could be placed in series with the SCR having a holding voltage greater than the off-hook voltage of the telephone set. In this manner, when one of the telephones are placed off-hook, there will be insufficient voltage to hold the Zener diode and the SCR will turn off. A separate switch or separate tone generator could also be utilized at each telephone set which would generate a second frequency to cause the SCR to turn off. By using a flip-flop, the same frequency could be utilized, whereby upon the first application of the frequency signal the hold condition is placed on the line, and with application of a second occurrence of the same frequency signal the hold condition could be removed from the line. Alternate modifications could be conceived by those skilled in the art to effect automatic release of the circuit shown in FIG. 3.

Referring now to FIG. 4 there is shown an alternate type of line seizure circuit 40a which includes as the load an indicator shown as light 122 in series with a resistor 124 and including a capacitor 126 in parallel across the series combination of the lamp and the resistor. With the inclusion of the lamp and capacitor, there is ensured an automatic release of the holding condition upon placing of any one of the extension telephones in an off-hook condition.

When the hold condition is to be established, as before, the appropriate audio frequency tone is placed upon the telephone line which is then detected by the frequency detector causing the gate electrode of the SCR 118 to be triggered, thereby switching the SCR into conduction. At that time, current immediately will flow through the SCR and at the same time the indicator light 122 will immediately turn on. The capacitor begins to charge to the series voltage across the load combination of the light 122 and resistor 124. Since the SCR has very little voltage across it, substantially all of the telephone line voltage will be developed across the load combination 122, 124. Accordingly, as long as the telephone is maintained off-hook the capacitor voltage will charge to substantially the off-hook voltage. However, when the telephone is placed in the on-hook position, the on-hook voltage is substantially larger in magnitude, so that the capacitor voltage charges to this larger value, whereby the voltage across the capacitor exceeds in magnitude the lower voltage across the telephone lines when the telephone handset is removed off-hook.

Subsequently, when one of the telephones is removed off the hook, the voltage across the line suddenly drops to a lower magnitude. However, since the voltage across the capacitor cannot change instantaneously, there is an instantaneous reversal of voltages across the SCR which immediately turns off the SCR so that it becomes non-conductive thereby removing the load from the telephone lines and releasing the hold condition.

By way of example only, if the on-hook voltage is $-25$ volts, substantially all of this voltage would be across the capacitor 126. When the holding party wants to resume talking, and thus removes the telephone handset off-hook, the terminal voltage across the telephone line drops to approximately $-5$ volts. The voltage across the capacitor remains momentarily at $-25$ volts, and therefore the voltage across the SCR must become equal to approximately $+20$ volts. This sudden reversal of voltage across the SCR immediately turns it off thereby releasing the hold condition.

It should be noted at this juncture that the resistor 124 is not a mandatory component of the load network. A lamp of appropriate resistive value would suffice. Conversely, the lamp may also be replaced by an appropriate resistor of a suitable ohmic value.

Referring now to FIG. 5 there is shown the possibility of including an external audio sound onto the telephone line upon affecting the hold condition. In FIG. 5, connected in series between the load circuit and the SCR is a transformer 125 having a primary 128 and a secondary 130 with resistor 132 connected across the primary. An audio source 136 is connected to the secondary. The audio source can be a tape deck, a radio, or any other source of audio sound.

When the SCR 118 is activated to cause current to pass through the load circuit, thereby placing the hold condition on the line, current will also pass through the primary, energizing the transformer to cause the audio source to be coupled to the telephone line. By making the audio source music, there is provided a music-on hold condition. Additionally, new or other type of audio can be provided so that whenever the hold condition is established, the audio sound will be impressed onto the telephone line. Of course, upon release of the holding circuit, the audio source will no longer be impressed onto the telephone line.

The audio impressed onto the telephone line serves as well as a feed-back verification to a user of the instant invention that the hold circuitry has in fact successfully been activated from the actuating means.

In the case of a Touch-tone telephone instrument, activation of the hold circuit by a touch key will result in attenuation of the Touch-tone signal level thereby serving as a verification feed-back to a user that the hold condition has been successfully established.

Although a phase lock loop has been shown for use as a frequency detector, other types of frequency detectors can be utilized as is well known in the art. For example as shown in FIG. 6, a tank circuit can be utilized as the frequency detector, and include the inductive coil 138 in parallel with the capacitor 140 to provide a tuned frequency detector. In FIG. 7 there is shown a variable frequency detector, including the inductive coil 142 and the variable capacitor 144 forming the variable tank circuit. Similarly, other types of frequency detectors could be utilized depending upon the tone and the number of frequency signals.

Referring now to FIG. 8, there is shown a telephone system including individual telephones 150, 152, 154, each of the rotary-dial type telephone. Each of these telephones are interconnected to the telephone lines 156, 158 which in turn interconnect to a central office. A hold circuit 160 is connected onto the telephone lines 156, 158. A single hold circuit 160 will be utilized for all of the various telephone extensions connected onto the telephone lines 156, 158.

Referring now to FIG. 9, there is shown a block diagram of the hold circuit 160, interconnected to the telephone lines 156, 158. The hold circuit includes a line seizure means 162, of a type similar to that previously described in connection with the Touch-tone type system. There is also included a dialing pulse detector 164 which receives a signal from a disabling timer 166.

In operation, the disabling timer 166 detects when the telephone is removed from an on-hook condition and placed in an off-hook condition. At that time it provides a timed delay which can be adjusted to a predetermined length. This delay is provided sufficiently long to permit the dialing of a complete telephone number. Following this predetermined timed delay, the timer then activates the dialing pulse detector 164 which can now detect any further numbers that are dialed onto the telephone line 64 of the rotary dialer. When such further number is dialed, the dialing pulse detector will detect that number and in response thereto activate the line seizure means 162 to place it into a hold condition. subsequently, when the telephone is placed in an on-hook condition, the hold is retained onto the line. When the telephone is then placed again in an off-hook condition, or when the called party disconnects the telephone call, the line seizure means will release the line and remove the hold condition.

Specifically, by way of example, the disabling timer can be set at approximately one minute. Thus, when one of the telephones interconnected to the telephone lines 156, 158 is placed in an off-hook condition, the disabling timer 166 begins counting the one minute time period. During this time there is sufficient opportunity for the user to dial a telephone number as desired. There will probably be sufficient time for the number to begin ringing and for the telephone conversation to begin. At the end of the one minute predetermined time, the dialing pulse detector 164 is enabled.

The dialing pulse detector 164 will monitor the telephone line for the entry of a further telephone number. By way of example, and for simplification purposes, the number "1" is utilized to activate the hold circuit. Therefore, after the one minute disabling time period, at any further time during the conversation when the user desires to place his telephone in a hold condition, all he need do is to dial the number "1" on his rotary dialer. The dialing pulse detector 164 will detect such number "1" being dialed, and will cause the line seizure means to place the telephone in a hold condition.

As heretofore explained, once the line seizure means is activated, even if the telephone remains off-hook, the line is potentially in a hold condition. Voice communication can continue until the telephone is placed into its on-hook condition. At that time, the telephone line will not be released but will be held by means of the line seizure means. Subsequently, upon the placing of any of the telephones connected to the telephone lines in an off-hook condition, the line seizure means will release the line.

Although the number "1" has been selected for operation of the circuit, it will be understood that the dialing of any other number could similarly activate the dialing pulse detector and place the hold condition on the telephone line. It is therefore appreciated that no extra activating circuits need be included at any of the extensions, and the rotary dialer itself on any of the telephone extensions can be utilized for the purpose of activating the single hold circuit. Furthermore, it should be appreciated that a single hold circuit is all that is needed for placing the hold circuit on the line.

Referring now to FIG. 10, there is shown one embodiment of an electrical schematic of the hold circuit 160 which includes the disabling timer, shown within the dotted lines 166, the dialing pulse detector, shown within the dotted lines 164, and the line seizure means 162. The telephone lines 156, 158 are interconnected to the hold circuit 160 by means of the switching unit 168. A reversal type switching device is utilized in order to ensure that the upper line 170, which is an extension of telephone line 156, will have the positive voltage, while the lower line 172, acting as an extension of telephone line 158, will be on the negative side. Connected across the telephone line is a capacitor 174. The upper end of the capacitor, designated as the point D is coupled to the upper line 170 by means of the resistor 176 and the reverse diode 178. A further reverse diode 180 is connected between the positive side of the capacitor 174 and the negative side of the telephone line. Resistors 182 and 184 are connected in series and the series circuit placed in parallel across the capacitor 174.

Interconnected to the point D are reverse back-to-back diodes 186 and 188 with center point therebetween being connected by means of the resistor 190 to the positive line 170. The Darlington PNP amplifiers 192 and 194 are so connected that the input base 196 of the Darlington amplifiers is connected to the positive side of the diode 188. The emitter 198 of the amplifiers is connected to the positive side of a battery supply 200. The collectors are connected to a point designated A, to which is also connected a capacitor 202 in parallel with a resistor 204.

A capacitor 206 is connected in series between the output of the Darlington amplifiers and the input of an NPN transistor 208. Base resistors 210 and 212 are connected to the transistor 208. The negative side of the capacitor 206 is designated as the point C.

The output of the transistor 208 passes through a voltage divider 214, 216, which feeds, at point B, the gate of an SCR 218. In series with the SCR is resistor 220, indicator lamp 222, and resistor 224. Capacitor 226 is placed across the series connected lamp 222 and resistor 224. A transformer, shown generally at 228, interconnects a speaker, such as a radio or other source of music through the coupling connector 230. A capacitor 232 in parallel with a resistor 234 is connected across the base-emitter of the Darlington amplifers.

Figure 11B:
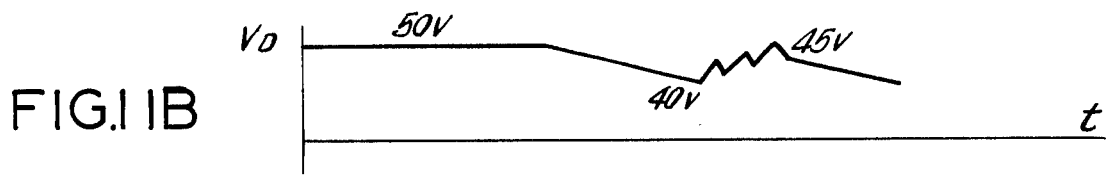
Figure 12A:
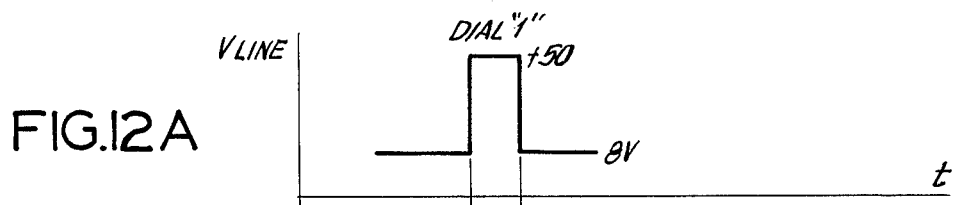
FIG. 12A showing the line voltage, FIG. 12B showing the voltage at Point A and FIG. 12C showing the voltage at Point C along a time axis as a function of placing the circuit in a hold condition by dialing the number "1"
Figure 12B:
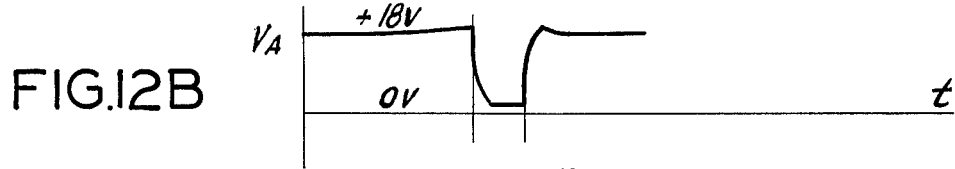
Figure 12C:
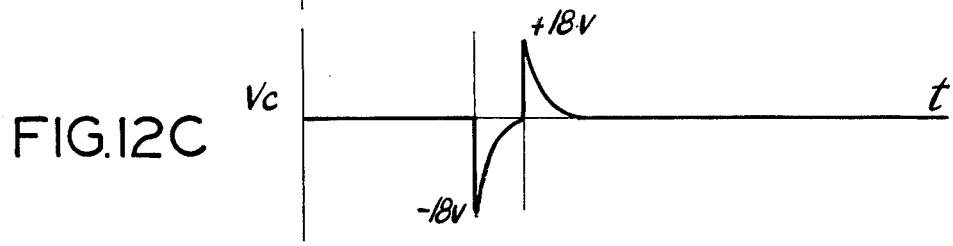
Figure 13A:
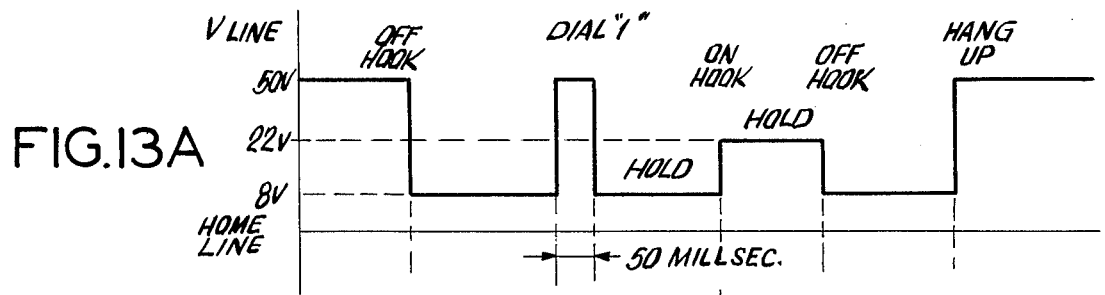
FIG. 13A showing the line voltage and FIG. 13B showing the voltage at point A along a time axis as a function of the complete hold cycle.
Figure 13B:
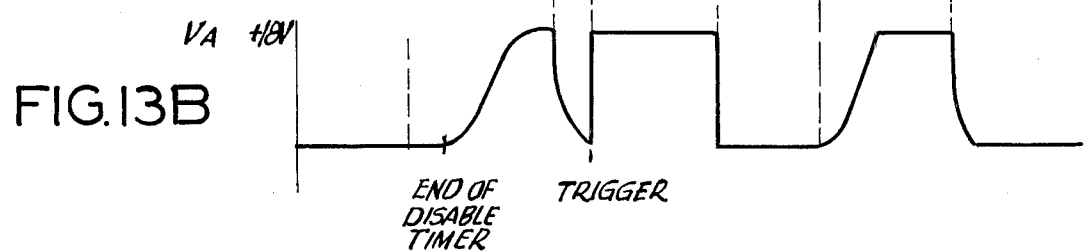

The operation of the circuit shown in FIG. 10 will best be understood by reference to the graphs shown in FIGS. 11–13. When the telephone is initially on-hook, the magnitude of the line voltage is typically approximately 50 volts. This is shown in FIG. 11A. At that time, the capacitor 174 will be in a steady state condition, being charged at the 50 volts through the diode 178. Thus, in a normal on-hook condition, the voltage at point D will be approximately 50 volts as shown in FIG. 11B.

When the phone is removed off-hook, the voltage on the line drops from its 50 volt level down to approximately 8 volts. The capacitor 174 is then permitted to discharge on the one hand through resistors 182, 184 and at the same time through resistor 190 passing through the diode 186. The discharge time of the capacitor is so arranged as to be sufficiently long to permit the dialing of additional numbers. For example, as shown in FIG. 11A, if a number such as number "3" is dialed on the rotary dialer of the telephone, three short 50 millisecond pulses will appear on the line each having an amplitude of up to 50 volts. These pulses will cause the capacitor to have a slight increase in voltage, however, after that slight increase the voltage on the capacitor will continue to decay.

In this manner, the capacitor continues to discharge at a rate sufficiently long to permit the dialing of all the numbers desired in the telephone number being called. After such dialing, the voltage on the capacitor will continue to discharge down to the 8 volt level.

When the telephone is in its off-hook condition, and with the capacitor continuing to discharge, the voltage on the capacitor will reach a point, for example, approximately 16 volts, at which the voltage at the interconnection between the diodes 186 and 188 will be sufficiently low to cause the transistors 192 and 194 to conduct. As the conduction continues and the transistors 192 and 194 turn on, the voltage at point A at the output of the transistors will rise to the voltage provided by the battery supply 200, for example 18 volts. Once the transistors 192, 194 are fully turned on, the 18 volts will remain held at the point A. This voltage is shown in the graph in FIG. 12B which shows the voltage at point A.

When the user wishes to place the circuit in a hold condition, he dials a number on his rotary dialer, for example, the number "1". The dialing of the number "1" will immediately place a 50 millisecond pulse of approximately 50 volts onto the line, as shown in FIG. 12A. The sudden increase in the voltage across the lines 170, 172 raises the voltage at the input to the transistors 192 and 194 to momentarily cut off the transistors, suddenly reducing the output at the point A down to a zero value. However, after the passage of the single pulse, the voltage on the line will again return to its 8 volt off-hook level and again the transistors 192, 194 will immediately be returned to their steady state on condition, whereby the voltage at point A immediately rises back to the 18 volts. This is shown in FIG. 12B.

During the on time of amplifiers 192 and 194, when the voltage at point A is held at a constant 18 volts, there is no voltage across the capacitor 206. However, as the sudden negative pulse appears at the point A, at the negative side of the capacitor 206, indicated as point C, there will appear first a negative spike of −18 volts followed by a positive spike of +18 volts, as shown in FIG. 12C. The sudden appearance of the spikes at point C causes the transistor 208 to turn on, whereby current is sent to the gate of the transistor 218 at the point B to turn on the SCR 218.

The line seizure means 162 is noted to be substantially identical to that previously described, as for example in FIG. 4. Once the SCR 218 is turned on it will permit charging of the capacitor 226 as well as permit current passing through the resistor 224 and the lamp 222. Therefore, the lamp 222 will immediately turn on providing a visual indication that the hold circuit has been energized. The capacitor 226 will also charge sufficiently to ensure disconnection of the hold circuit subsequently after the telephone is returned on-hook and then removed off-hook.

FIG. 13 shows the complete hold cycle of the line voltage, as well as the voltage at point A at the output of the transistors 192, 194. Initially, in the on-hook condition 50 volts appears on the line. The capacitor 174 will be charged to the 50 volts. When the telephone is removed off-hook, the voltage drops to approximately 8 volts and the capacitor will begin discharging. After the sufficient time, as provided, the capacitor will discharge sufficiently to turn on the transistors 192, 194 whereby the voltage at point A will begin to rise to the voltage of the battery, approximately 18 volts. It will remain at the 18 volt level until the user wants to place the hold condition on the line. The user will then dial "1" on his rotary dialer, which causes the voltage at point A to suddenly drop and then return to its 18 volt level. This will trigger the line seizure means to place a hold condition on the line. As shown in FIG. 13A, the hold condition is placed on the line, however, voice communication can continue. When the telephone is subsequently placed on-hook the hold condition on the line will keep the voltage below the 50 volts, and approximately 22 volts, as shown, whereby the line will be held even though the phone is returned on-hook.

When any of the telephones connected to the telephone line are subsequently removed off-hook, the voltage again drops down to the 8 volt level.

The capacitor 202 connected to the point A is used as a pulse or transient depressor. The capacitor 232 serves as an RF transient depressor. The use of the diode 178 helps to maintain the charge on the capacitor 174 at the 50 volt level, as desired, during the steady state operation. The use of the additional resistors in the line 182 and 184 provide isolation of the phone line from the present circuit. The additional resistors shown in FIG. 10 are utilized in conjunction with standard procedure for biasing the various transistors as is known in the art.

In the various line seizure circuits as shown, there is included a lamp indicator as part of the load circuitry. Utilizing the indicator lamp, it is possible to provide an indication when the hold condition has been effected. As soon as the hold condition is produced, the indicator light bulb will illuminate. Also, when the hold condition is released, the lamp light will be eliminated. Additionally, the lamp can provide an indication of when someone is eavesdropping. When the hold signal is effected, the lamp will be illuminated dimly. When the telephone is placed onto its cradle the lamp will illuminate brightly. However, while the telephone is off-hook the hold circuit can be affected whereby the lamp will be illuminated dimly. Then, should someone pick up an extension, the lamp will provide even further reduction in illumination, thereby giving an indication that someone has picked up an extension.

Using any of the aforedescribed hold circuits, it is also possible to "busy out" a telephone line to prevent disturbances due to telephone rings. This may be achieved by the subscriber having an above described type of hold circuit and dialing his own telephone number. A busy signal appears on the line. If the hold circuit is now affected and the handset is placed on-hook, the busy line should continue indefinitely until the telephone handset is placed off the hook. The circuits thus permit the telephone handset to be on-hook without removing the "busy" line condition. Also, since the telephone handset is not merely left "off the hook" as is typically done to prevent ringing, the loud disturbing "off-hook" signals are avoided.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What I claim is:

1. A telephone line hold circuit connected with a telephone line and at least one telephone instrument connected to said telephone line for establishing a hold condition on the telephone line, said telephone instrument having an on-hook state and an off-hook state, said telephone instrument including switch means for imposing an electronic actuating signal onto said telephone line independent of said hold circuit upon manual actuation of said switch means, said hold circuit comprising, in combination, responsive means and line-seizure means, said actuating signal causing said responsive means to produce an output voltage, said output voltage affecting activation of said line-seizure means to seize said telephone line for establishing said hold condition, and said manual actuation of said switch means being operative to affect said hold condition only in said off-hook state.

2. A telephone line hold circuit as claimed in claim 1, wherein said telephone instrument is directly connected to said telephone line independent of said hold circuit, said switch means being an integral component of said telephone instrument for placing outgoing calls.

3. A telephone line hold circuit as claimed in claim 1, wherein said telephone line includes usual voltage conditions prevalent on a telephone line, said electronic actuating signal constituting a momentary line voltage rise and an instantaneous subsequent fall substantially within a prescribed voltage magnitude range occurring substantially within a prescribed time period.

4. A telephone line hold circuit as claimed in claim 1, wherein said actuating signal is operative to affect a latched condition of said hold circuit only in said off-hook state.

5. A telephone line hold circuit as claimed in claim 2, wherein said switch means includes call-out means to permit outgoing telephone calls from said telephone instrument, and said call-out means being utilized to impose said electronic actuating signal directly onto said telephone line.

6. A telephone line hold circuit as claimed in claim 5, wherein said line-seizure means includes latching circuit means.

7. A telephone line hold circuit as claimed in claim 6, wherein said latching circuit means includes a semiconductor latching element having a pair of current carrying electrodes coupled to the telephone line, and a control electrode, a load being connected in series between said current carrying electrodes and the telephone line, said control electrode being activated in response to said output voltage to cause current from the telephone line to pass through said load.

8. A telephone line hold circuit as in claim 7, wherein said load is a resistive element having a value to affect a holding voltage across said telephone line.

9. A telephone line hold circuit as claimed in claim 5, wherein said call-out means includes telephone instrument dial means.

10. A telephone line hold circuit as claimed in claim 9, wherein said telephone line exhibits a higher voltage and a lower voltage, the voltage magnitude variation being a function of said telephone instrument condition being in an on-hook or off-hook state, respectively, and wherein operation of said dial means in said off-hook state produces said electronic actuating signal as a dial pulse onto said telephone line affecting a momentary voltage rise and fall from said lower voltage level magnitude to substantially said higher voltage level magnitude and then back to said lower voltage magnitude, said voltage rise and fall occurring substantially within a prescribed time period, and wherein said responsive means senses said voltage rise and fall producing said output voltage in response thereto.

11. A telephone line hold circuit as claimed in claim 10, wherein said responsive means includes a dial pulse detection circuit to sense the presence of said dial pulse.

12. A telephone line hold circuit as claimed in claim 11, wherein said dial pulse detection circuit includes capacitive means and electronic switching circuit means, said capacitive means being connected with said switching circuit means, capacitive means in response to said voltage rise and fall producing an output voltage pulse causing actuating of said switching circuit means, said switching circuit means actuating said line-seizure means.

13. A telephone line hold circuit as claimed in claim 12, wherein said capacitive means includes a capacitor having a capacitance value substantially such as to develop said output voltage pulse in response to said voltage rise and fall occuring substantially within said prescribed period.

14. A telephone line hold circuit as claimed in claim 13, wherein said dial pulse detection circuit includes off-on conducting means, said off-on means being in a non-conductive state during said higher voltage condition and in a conductive state during said lower voltage condition, said off-on conducting means switching off and on in response to said voltage rise and fall, respectively, and causing a corresponding discharge and subsequent charge, respectively, of said capacitor thus generator said output voltage pulse.

15. A telephone line hold circuit as claimed in claim 14, wherein a time delay network means is operatively associated with said dial pulse detection circuit inhibiting said detection circuit for substantially a predetermined time interval after said lower voltage condition is first obtained.

16. A telephone line hold circuit as claimed in claim 15, wherein said time delay network includes delay means including capacitive means having a charge storage property operatively associated with said off-on conducting means so as to maintain said off-on means in its non-conductive state when said capacitive means is charged substantially to a predetermined voltage level.

17. A telephone line hold circuit as claimed in claim 11, wherein a number "1" is dialed on said telephone instrument dial in order to produce said dial pulse.

18. A telephone line hold circuit as claimed in claim 11, wherein any suitable number is dialed on said telephone instrument dial in order to produce said dial pulse.

19. A telephone line hold circuit as claimed in claim 5, wherein said call-out means includes a telephone instrument push button pad.

20. A telephone line hold circuit as claimed in claim 19, wherein said responsive means includes a frequency signal detection circuit to sense the presence of a predetermined frequency onto the telephone line producing said output voltage in response thereto.

21. A telephone line hold circuit as claimed in claim 2, wherein release of said hold condition is affected by rendering said telephone instrument condition into said on-hook state and, subsequently, into said off-hook state.

22. A telephone line hold circuit as claimed in claim 2, wherein said actuating means upon momentary actuation octivates the hold circuit into a sustained established hold mode, even after said momentary actuation has been curtailed.

23. A telephone line hold circuit as claimed in claim 22, wherein said telephone instrument is equipped with call-out means for the purpose of dialing, said call-out means being utilized to function as the said switch means.

24. A telephone line hold circuit as claimed in claim 23, wherein said responsive means includes a dial pulse detection circuit to sense the presence of a dial pulse onto the telephone line and producing said output voltage in response thereto.

25. A telephone line hold circuit as claimed in claim 24, wherein time delay network means is connected with said dial pulse detection circuit inhibiting said detection circuit for substantially a predetermined time interval after said off-hook state is first obtained.

26. A telephone line hold circuit as claimed in claim 22, wherein said line-seizure means includes latching circuit means.

27. A telephone line hold circuit as claimed in claim 26, wherein said latching circuit means includes a semiconductor latching element having a pair of current carrying electrodes coupled to the telephone line, and a control electrode, a load being connected in series between said current carrying electrodes and the telephone line, said control electrode being activated in response to said output voltage to cause current from the telephone line to pass through said load.

28. A telephone line hold circuit as claimed in claim 27, and wherein said load is a resistive element having a value to affect a holding voltage across said telephone line.

29. A telephone line hold circuit as claimed in claim 27, and wherein said load includes a visual indicator to affect a holding voltage across said telephone line.

30. A telephone line hold circuit as claimed in claim 29, wherein said visual indicator has characteristics which result in lighting of the same upon passage of a predetermined current flow therethrough, said indicator thereby producing a visual indication in the activated state of the line-seizure means that said telephone line is in a seizure mode.

31. A telephone line hold circuit as claimed in claim 30, wherein said visual indicator includes a lamp connected in series with said line-seizure means in a current conductive mode thereof, whereby subsequent to the actuation of said hold circuit, an "off-hook" condition of any one of associated telephone instruments will reduce brightness of said lamp.

32. A telephone line hold circuit as claimed in claim 27, wherein a capacitor is connected in parallel to said load, for providing a parallel combination means to ensure that in the hold condition of said telephone line, a line voltage is developed across said capacitor to cause said seizure means to release the telephone line upon rendering of said telephone instrument into its off-hook condition subsequent to a hold mode condition and consequent corresponding voltage level magnitude variation of said line voltage.

33. A telephone line hold circuit as claimed in claim 26, wherein said latching circuit means includes means for releasing said hold condition in response to sensing an interruption of a existing connection of said telephone line network with the far-end telephone line network.

34. A telephone line hold circuit as claimed in claim 26, wherein said line-seizure means further includes means for coupling an audio signal to said telephone line upon the establishing of said hold condition.

35. A telephone line hold circuit as claimed in claim 26, wherein said latching circuit means includes means for releasing said hold condition in response to subsequent rendering of any associated telephones in an off-hook condition.

36. A telephone line hold circuit as claimed in claim 2, wherein said telephone instrument remains in voice communication with the telephone line until it is placed in its on-hook condition, even though said hold condition is established.

37. A telephone line hold circuit as claimed in claim 36, wherein said hold circuit further includes means for coupling an audio signal to said telephone line during said hold condition, said audio signal upon activation of said hold circuit is audible via said instrument until said instrument is placed into its on-hook condition.

38. A telephone line hold circuit as claimed in claim 37, wherein said audio signal upon activation of said hold circuit, serves as a feed-back verification that the hold circuit has been activated.

39. A telephone line hold circuit as claimed in claim 36, wherein said telephone instrument includes a push button pad; said pad including and activating said switch means; and when said hold circuit is activated by operation of said pad, said hold circuit attenuates the level of said actuating signal to thereby serve as a feedback verification that the hold circuit has been activated.

40. A telephone line hold circuit as claimed in claim 39, wherein said responsive means includes a frequency signal detection circuit to sense the presence of a predetermined frequency signal onto the telephone line producing said output voltage in response thereto.

41. A telephone line hold circuit as claimed in claim 40, wherein said telephone instrument includes signaling means to generate said frequency signal onto voice path of the telephone line.

42. A telephone line hood circuit as claimed in claim 40, wherein said frequency signal includes an audio frequency signal, and wherein said frequency detection circuit includes means for detecting said audio frequency signal.

43. A telephone line hold circuit as claimed in claim 42, wherein said audio signal is a multi-tone signal.

44. A telephone line hold circuit as claimed in claim 42, wherein said audio signal is a dual tone signal.

45. A telephone line hold circuit as claimed in claim 42, wherein said audio signal is generated by said push button pad.

46. A telephone line hold circuit as claimed in claim 2, wherein said hold circuit includes "busy out" means to load said telephone line for extended periods of time when said "busy out" means is actuated to provide a "busy" condition on the telephone line independent of condition of telephone handset.

47. A telephone line hold circuit connected with a telephone line and at least one telephone instrument connected to said telephone line and including actuating signal means for establishing a hold condition on said telephone line, said telephone instrument having an on-hook state and an off-hook state, said actuating signal means upon manual actuation imposing an electronic frequency signal onto said telephone line, said hold circuit including, in combination, frequency signal responsive means and line-seizure means, said frequency signal responsive means receiving said electronic frequency signal and producing an output voltage upon actuation of said actuating signal means, said output voltage affecting activation of said line-seizure means to seize said telephone line establishing said hold condition, and said manual actuation of said actuating signal means being operative to affect said hold condition only in said off-hook state.

48. A telephone line hold circuit as claimed in claim 47, wherein said telephone instrument is equipped with a push button pad and wherein said actuating signal means includes a "star-touch" key of said pad.

49. A telephone line hold circuit as claimed in claim 47, wherein said telephone instrument is equipped with a push button pad and wherein said actuating signal means includes a number sign key of said pad.

50. A telephone line hold circuit as claimed in claim 47, wherein said actuating signal means includes a frequency generator, said generator when actuated producing an audio frequency signal, said audio signal being acoustically coupled to said telephone line.

51. A telephone line hold circuit as claimed in claim 50, wherein said audio frequency signal is a multi-tone signal.

* * * * *

UNITED STATES PATENT AND TRADEMARK OFFICE
CERTIFICATE OF CORRECTION

PATENT NO. : 4,243,844
DATED : January 6, 1981
INVENTOR(S) : Herbert H. Waldman

It is certified that error appears in the above-identified patent and that said Letters Patent are hereby corrected as shown below:

In Claim 22, line 2, change "actuating" to --switch--;

line 3, change "octivates" to --activates--.

Signed and Sealed this

Twenty-sixth Day of April 1983

[SEAL]

Attest:

GERALD J. MOSSINGHOFF

Attesting Officer    Commissioner of Patents and Trademarks